United States Patent
Akino et al.

(10) Patent No.: US 9,337,609 B2
(45) Date of Patent: May 10, 2016

(54) PASSIVELY Q-SWITCHED ELEMENT AND PASSIVELY Q-SWITCHED LASER DEVICE

(71) Applicant: Mitsubishi Electric Corporation, Tokyo (JP)

(72) Inventors: Yosuke Akino, Tokyo (JP); Yoshihito Hirano, Tokyo (JP); Takayuki Yanagisawa, Tokyo (JP); Hidenori Fukahori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/390,901

(22) PCT Filed: Apr. 25, 2013

(86) PCT No.: PCT/JP2013/062252
§ 371 (c)(1),
(2) Date: Oct. 6, 2014

(87) PCT Pub. No.: WO2013/168587
PCT Pub. Date: Nov. 14, 2013

(65) Prior Publication Data
US 2015/0117476 A1    Apr. 30, 2015

(30) Foreign Application Priority Data
May 9, 2012  (JP) .................. 2012-107393

(51) Int. Cl.
*H01S 3/113*     (2006.01)
*H01S 3/11*      (2006.01)
(Continued)

(52) U.S. Cl.
CPC ............... *H01S 3/11* (2013.01); *G02F 1/3523* (2013.01); *H01S 3/067* (2013.01); *H01S 3/1061* (2013.01);
(Continued)

(58) Field of Classification Search
CPC ..... H01S 3/1115; H01S 3/113; H01S 3/1061; G02F 1/3523
See application file for complete search history.

(56) References Cited

U.S. PATENT DOCUMENTS 3,440,562 A * 4/1969 Koester .............................. 372/8
3,626,319 A * 12/1971 Young ............................. 372/40
(Continued)

FOREIGN PATENT DOCUMENTS

EP    0817336 A1    1/1998
EP    1978611 A1    10/2008
(Continued)

OTHER PUBLICATIONS

International Search Report; PCT/JP2013/062252; Jun. 25, 2013.
(Continued)

*Primary Examiner* — Joshua King
(74) *Attorney, Agent, or Firm* — Studebaker & Brackett PC

(57) ABSTRACT

Provided is a passively Q-switched element or the like, which enables mode selection without increasing the number of components in a resonator in a Q-switched pulse laser or the like that oscillates in a great number of high-order modes and which is also applicable to a waveguide type laser in which a mode cannot be controlled spatially. By combining a saturable absorber (2) with a transparent material (3) which is transparent to a laser oscillation wavelength or the like, a passively Q-switched element having a mode selection function and a passively Q-switched laser device in which a passively Q-switched element has a mode selection function, and a planar waveguide type passively Q-switched element and passively Q-switched laser device are provided.

13 Claims, 8 Drawing Sheets

(51) Int. Cl.
*G02F 1/35* (2006.01)
*H01S 3/106* (2006.01)
*H01S 3/067* (2006.01)
*H01S 3/063* (2006.01)
*H01S 3/08* (2006.01)
*H01S 3/0941* (2006.01)

(52) U.S. Cl.
CPC ......... *H01S 3/113* (2013.01); *G02F 2001/3503* (2013.01); *H01S 3/063* (2013.01); *H01S 3/0805* (2013.01); *H01S 3/09415* (2013.01)

(56) References Cited

U.S. PATENT DOCUMENTS

| | | | |
|---|---|---|---|
| 5,394,413 A | | 2/1995 | Zayhowski |
| 5,441,803 A | * | 8/1995 | Meissner ................. 428/220 |
| 5,483,546 A | | 1/1996 | Johnson et al. |
| 5,502,737 A | | 3/1996 | Chartier et al. |
| 5,506,858 A | | 4/1996 | Takenaka et al. |
| 5,586,139 A | | 12/1996 | Takenaka et al. |
| 5,963,578 A | | 10/1999 | Fulbert et al. |
| 6,014,393 A | | 1/2000 | Fulbert et al. |
| 6,160,824 A | * | 12/2000 | Meissner et al. ............. 372/7 |
| 6,288,835 B1 | * | 9/2001 | Nilsson et al. .......... 359/341.3 |
| 7,382,818 B2 | * | 6/2008 | Sumida et al. ............... 372/72 |
| 2008/0247425 A1 | | 10/2008 | Welford |
| 2008/0298407 A1 | | 12/2008 | Ikesue |
| 2009/0310631 A1 | | 12/2009 | Kaertner et al. |

FOREIGN PATENT DOCUMENTS

| | | |
|---|---|---|
| JP | S64-81376 A | 3/1989 |
| JP | H06-26273 B2 | 4/1994 |
| JP | H07-183607 A | 7/1995 |
| JP | H10-84157 A | 3/1998 |
| JP | 2980788 B2 | 11/1999 |
| JP | 2005-327997 A | 11/2005 |
| JP | 2009-010066 A | 1/2009 |
| WO | 95/22186 A1 | 8/1995 |

OTHER PUBLICATIONS

Koechner W.; "Solid-State Laser Engineering"; Sixth Revised and Updated Edition; p. 528; Fig. 8.29; 2006.
Zayhowski John J. et al.; IEEE Journal of Quantum Electronics; Dec. 2003; vol. 39 No. 12; p. 1588-1593.
Dong Jun et al.; Optics Letters; Nov. 15, 2007; vol. 32 No. 22; p. 3266-3268.
Yosuke Akino et al.; "LAV-10-24 Passive Q-switched planar waveguide laser using a saturation absorber"; The Institute of Electrical Engineers of Japan Kenkyukai Shiryo Hikari Oyo Shikaku Kenkyukai; Dec. 27, 2010; p. 1-5.
MacKenzie J. I. et al.; Optics Letters; Dec. 15, 2002; vol. 27 No. 24; p. 2161-2163.
Communication pursuant to Rule 164(1) EPC issued by the European Patent Office on Feb. 15, 2016, which corresponds to European Patent Application No. 13787075.4-1556 and is related to U.S. Appl. No. 14/390,901.

\* cited by examiner

PASSIVELY Q-SWITCHED ELEMENT AND PASSIVELY Q-SWITCHED LASER DEVICE

TECHNICAL FIELD

The present invention relates to a passively Q-switched element using a saturable absorber, and more specifically, to a passively Q-switched element having a mode selection function or the like.

BACKGROUND ART

It is known that a saturable absorber is a material whose transmittance changes depending on the absorption amount of light, and serves as a Q-switched device only by being inserted into a laser resonator. The saturable absorber suppresses laser oscillation in a weakly excited state, but when a laser material is strongly excited, and a gain becomes higher than a loss in a resonator including a loss caused by the absorption by the saturable absorber, laser oscillation starts in the resonator. In this case, when the saturable absorber absorbs strong laser light, the absorption is saturated due to the depletion of lower-level ions, and the saturable absorber abruptly becomes transparent with respect to laser light. As a result of this operation, the Q-value of the resonator increases, and Q-switch oscillation occurs.

As an example of a passively Q-switched laser, there has been reported a passively Q-switched laser including a semiconductor laser, a combined optical system, a slab-type laser material, a total reflection mirror, an output mirror, and a saturable absorber (see Non Patent Literature 1).

A general solid-state pulse laser as disclosed in Non Patent Literature 1 oscillates in a great number of high-order modes. The spread of laser light oscillating in a high-order mode is spatially large, compared to laser light in a single mode, and hence only oscillation in a low-order mode may occur if an aperture is limited to be small.

Therefore, in a related-art laser device, there has been proposed a laser device which suppresses the surrounding oscillation in an unnecessary mode with a shielding plate having minute holes serving as a transverse mode selection element in a resonator (see Patent Literature 1).

Further, as an example of a related-art solid-state laser device, there has been proposed a laser device in which a center portion of an output mirror is applied with a partial reflection coat and the outer circumferential portion thereof is applied with an antireflecting coat, to thereby control a mode in a resonator (see Patent Literature 2).

CITATION LIST

Patent Literature

[PTL 1] JP 06-26273 B (page. 4, FIG. 1)
[PTL 2] JP 2980788B (page. 24, FIG. 1)

Non Patent Literature

[NPL 1] W. Koechner, "Solid-State Laser Engineering", Sixth Revised and Updated Edition, P. 528, FIG. 8.29, 2006

SUMMARY OF INVENTION

Technical Problem

In the case where a shielding plate having minute holes used in the related-art solid-state laser device disclosed in Patent Literature 1 is inserted into a resonator of a Q-switched pulse laser, there is a problem in that the laser power in the resonator increases locally due to the diffraction by an edge portion of each hole of the shielding plate, with the result that optical components in the resonator are burnt. Further, there is also a problem in that the number of components in the resonator increases, which necessitates the adjustment of an optical axis of the shielding plate, resulting in the enlargement of the laser device and the increase in cost and number of man-hours. Further, there is also a problem in that the use of the above-mentioned shielding plate cannot be applied to a waveguide type laser in which a mode cannot be controlled spatially.

The related-art solid-state laser device disclosed in Patent Literature 2 has a problem in that a processing cost increases due to the presence of coatings having different reflectances in the output mirror. Further, there is a problem in that it is generally difficult to provide a distribution in reflectance through use of coatings in the above-mentioned region in a waveguide laser having a waveguide thickness of several to 100 μm, and hence providing a distribution in reflectance through use of coatings cannot be applied to a waveguide type laser.

The present invention has been achieved so as to solve the above-mentioned problems, and it is an object of the present invention to provide a passively Q-switched element or the like, which enables mode selection without increasing the number of components in a resonator in a Q-switched pulse laser that oscillates in a great number of high-order modes and the like and which is also applicable to a waveguide type laser in which a mode cannot be controlled spatially.

Solution to Problems

The present invention generally provides a passively Q-switched element or the like having a mode selection function by combining a saturable absorber with a transparent material which is transparent to a laser oscillation wavelength.

Advantageous Effects of Invention

The present invention can provide the passively Q-switched element or the like which enables the mode selection without increasing the number of components in the resonator in the passively Q-switched laser device that oscillates in a great number of high-order modes, including a waveguide type laser.

DESCRIPTION OF EMBODIMENTS

Now, a passively Q-switched element or the like according to the present invention is described by way of each embodiment with reference to the drawings.

Embodiment 1

Figure 1:
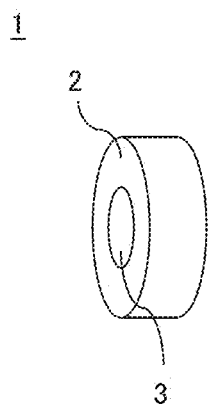
FIG. 1 is structural view illustrating a passively Q-switched element according to Embodiment 1 of the present invention.

FIG. 1 is a structural view illustrating a passively Q-switched element 1 according to Embodiment 1 of the present invention. In FIG. 1, the passively Q-switched element 1 includes a ring-shaped saturable absorber 2 and a disk-shaped (cylindrical shape in which the cross-section perpendicular to the propagation direction of laser light has a circular shape, which similarly applies to the following) transparent material 3, and the saturable absorber 2 is optically bonded to the circumference of the transparent material 3 (over the entire circumference of the laser light propagation direction axis, which similarly applies to the following). The transparent material 3 is a material transparent to a laser oscillation wavelength.

In the passively Q-switched element 1, the saturable absorber 2 and the transparent material 3 having substantially the same or the same refractive index and thermal expansion coefficient are used. For example, it is appropriate that a host material (base material crystal) of the saturable absorber 2 is used for the transparent material 3. When the refractive index difference between the saturable absorber 2 and the transparent material 3 is large, a loss caused by a wavefront aberration increases, and hence the refractive index difference is preferred to be small. For example, in order to set the wavefront aberration $\lambda/4$ or less at a p-v value (wavefront aberration loss of 0.012), assuming that the wavelength is 1,064 nm and the thickness of the passively Q-switched element 1 is 1 mm, the refractive index difference between the saturable absorber 2 and the transparent material 3 is estimated by the following expression:

$$\Delta\phi_{RMS} = 1/4 > \Delta n \times L/\lambda.$$

where $\Delta\phi_{RMS}$ = wavefront aberration
$\Delta n$: refractive index difference
L: thickness of passively Q-switched element 1
$\lambda$: wavelength
Thus, it is required that the refractive index difference be 0.000266 or less.

For example, in the case of using $Cr^{4+}$:YAG or $V^{3+}$:YAG for the saturable absorber 2, it is appropriate to use additive-free YAG having a refractive index (about 1.83) and a thermal expansion coefficient (about $7.8 \times 10^{-6}$/K) close to those of $Cr^{4+}$:YAG or $V^{3+}$:YAG for the transparent material 3.

Further, in the case of using Co:Spinel for the saturable absorber 2, it is appropriate to use additive-free Spinel having a refractive index (about 1.70) and a thermal expansion coefficient (about $7.45 \times 10^{-6}$/K) for the transparent material 3.

Further, in the case of using Co2+:ZnSe or Cr2+:ZnSe for the saturable absorber 2, it is appropriate to use additive-free ZnSe having a refractive index (about 2.49) and a thermal expansion coefficient (about $7.6 \times 10^{-6}$/K) for the transparent material 3. In the case of using Co2+:ZnS or Cr2+:ZnS for the saturable absorber 2, it is appropriate to use additive-free ZnS having a refractive index (about 2.29) and a thermal expansion coefficient (about $6.5 \times 10^{-6}$/K) for the transparent material 3.

Further, the saturable absorber 2 and the transparent material 3 are optically connected to each other, and for example, there is a method of integrally sintering the saturable absorber 2 and the transparent material 3 with a ceramics material.

Further, there is a method of integrally bonding the saturable absorber 2 to the transparent material 3 through diffusion bonding.

Further, there is a method of integrally bonding the saturable absorber 2 to the transparent material 3 through surface-activated bonding.

Further, there is a method of integrally bonding the saturable absorber 2 to the transparent material 3 through optical contact.

Further, there is a method of causing the saturable absorber 2 to adhere to the transparent material 3 integrally with an optical adhesive.

Figure 2:
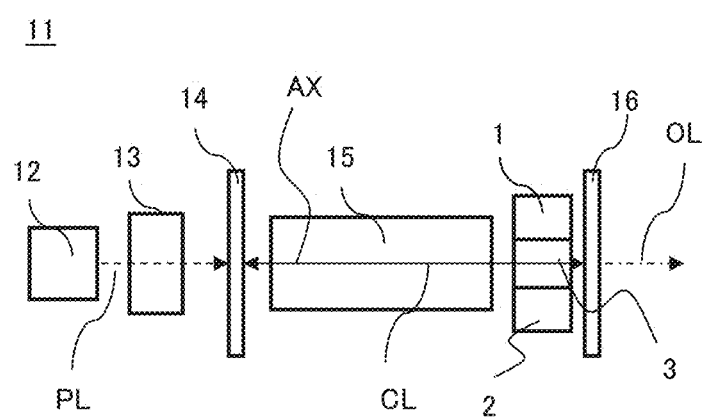
FIG. 2 is a structural view of a passively Q-switched laser device using the passively Q-switched element according to Embodiment 1 of the present invention.

Next, an operation is described. FIG. 2 is a structural view of a passively Q-switched laser device 11 using the passively Q-switched element 1. In FIG. 2, the passively Q-switched laser device 11 includes the passively Q-switched element 1, a semiconductor laser 12, an excitation optical system 13, a total reflection mirror 14, a laser material 15, and an output mirror 16. AX represents a laser light propagation direction axis (the same applies to the following).

Note that, the semiconductor laser 12 serves as an excitation light source for the laser material 15, and the total reflection mirror 14 and the output mirror 16 form a spatial resonator. AX represents a laser light propagation direction axis.

Excitation light PL is output from the semiconductor laser 12. The excitation light PL is shaped by the excitation optical system 13 so as to be collimated light in the laser material 15 and passes through the total reflection mirror 14 to enter the laser material 15. The laser material 15 is excited with the excitation light PL to generate spontaneous emission light. Part of the spontaneous emission light reciprocates between the total reflection mirror 14 and the output mirror 16 and is amplified every time the light passes through the laser material 15.

When a gain increases due to a loss in a resonator including a loss caused by the absorption by the saturable absorber 2, laser oscillation starts in the resonator. At a time of circulation where laser oscillation occurs, due to the passively Q-switched element 1, a component of resonance light CL which propagates through the saturable absorber 2 present on an outer side of the passively Q-switched element 1 is absorbed by the saturable absorber 2, and a component of the resonance light CL which propagates through the transparent material 3 present in the center portion of the passively Q-switched element 1 passes therethrough without any loss. Therefore, a loss of high-order mode light increases, and only light in a low-order mode oscillates. When oscillation occurs, the saturable absorber 2 absorbs laser light to become transparent. Therefore, a loss becomes small, and Q-switched pulse light in a low-order mode is generated with satisfactory efficiency. Part of the Q-switched pulse light is extracted from the output mirror 16 as oscillation light OL.

The total reflection mirror 14 and the output mirror 16 may be formed by integrally providing dielectric films on an end surface of the laser material 15 and an end surface of the passively Q-switched element 1, respectively. Thus, a device can be miniaturized.

Although the transparent material 3 is formed into a circular shape (disk shape), the transparent material may be formed into a rectangular shape (cubic shape: the shape of a cross-section perpendicular to the propagation direction of laser light is rectangular, which similarly applies to the following) and the saturable absorber 2 may be bonded to the circumference of the transparent material. Forming the transparent material into a cubic shape is effective in the case where the horizontal direction and the vertical direction of a beam can be separated.

As described above, in the passively Q-switched element 1 according to Embodiment 1 of the present invention, the ring-shaped saturable absorber 2 is optically bonded to the circumference of the disk-shaped transparent material 3. Therefore, the passively Q-switched element 1 is allowed to have a mode selection function besides the original Q-switch function, and Q-switched pulse light in a low-order mode with satisfactory efficiency can be obtained without changing the size of a laser device.

Embodiment 2

Figure 3:
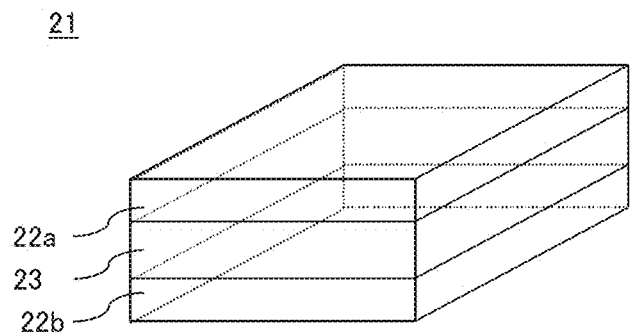
FIG. 3 is a structural view illustrating a planar waveguide type passively Q-switched element according to Embodiment 2 of the present invention.

FIG. 3 is a structural view illustrating a planar waveguide type passively Q-switched element 21 according to Embodiment 2 of the present invention. In FIG. 3, the planar waveguide type passively Q-switched element 21 includes a first saturable absorber 22a having a planar shape (for example, a rectangular plate shape which is flat in a propagation direction of laser light, which similarly applies to the following), a second saturable absorber 22b having a planar shape, and a transparent material 23 having a planar shape.

The first saturable absorber 22a and the second saturable absorber 22b are respectively bonded optically to two opposed surfaces (principal planes, which similarly applies to the following) of the transparent material 23, and a surface (principal plane on an outer side) of the first saturable absorber 22a opposed to the surface bonded to the transparent material 23 and a surface (principal plane on an outer side) of the second saturable absorber 22b opposed to the surface bonded to the transparent material 23 form a waveguide.

In the planar waveguide type passively Q-switched element 21, the transparent material 23 is formed of a material having a thermal expansion coefficient substantially equal to or equal to those of the first saturable absorber 22a and the second saturable absorber 22b so as to suppress cracking caused by a stress during bonding. Further, the transparent material 23 is formed of a material having a refractive index lower than those of the first saturable absorber 22a and the second saturable absorber 22b so as to suppress reflection at interfaces with respect to the first saturable absorber 22a and the second saturable absorber 22b.

For example, in the case where the first saturable absorber 22a and the second saturable absorber 22b are formed of $Cr^{4+}$:YAG or $V^{3+}$:YAG, it is appropriate to use additive-free YAG having a refractive index (about 1.83) and a thermal expansion coefficient (about $7.8 \times 10^{-6}$/K) close to those of $Cr^{4+}$:YAG or $V^{3+}$:YAG for the transparent material 23.

Further, in the case of using Co:Spinel for the first saturable absorber 22a and the second saturable absorber 22b, it is appropriate to use additive-free Spinel having a refractive index (about 1.70) and a thermal expansion coefficient (about $7.45 \times 10^{-6}$/K) for the transparent material 23.

Further, in the case of using Co2+:ZnSe or Cr2+:ZnSe for the first saturable absorber 22a and the second saturable absorber 22b, it is appropriate to use additive-free ZnSe having a refractive index (about 2.49) and a thermal expansion coefficient (about $7.6 \times 10^{-6}$/K) for the transparent material 23, and in the case of using Co2+:ZnS or Cr2+:ZnS for the first saturable absorber 22a and the second saturable absorber 22b, it is appropriate to use additive-free ZnS having a refractive index (about 2.29) and a thermal expansion coefficient (about $6.5 \times 10^{-6}$/K) for the transparent material 23.

Further, the first saturable absorber 22a and the second saturable absorber 22b are optically connected to the transparent material 23, and for example, there is a method of integrally sintering the first saturable absorber 22a and the second saturable absorber 22b, and the transparent material 23 with a ceramics material.

Further, there is a method of integrally bonding the first saturable absorber 22a and the second saturable absorber 22b to the transparent material 23 through diffusion bonding.

Further, there is a method of integrally bonding the first saturable absorber 22a and the second saturable absorber 22b to the transparent material 23 through surface-activated bonding.

Further, there is a method of integrally bonding the first saturable absorber 22a and the second saturable absorber 22b to the transparent material 23 through optical contact.

Further, there is a method of causing the first saturable absorber 22a and the second saturable absorber 22b to adhere to the transparent material 23 integrally with an optical adhesive.

Figure 4:
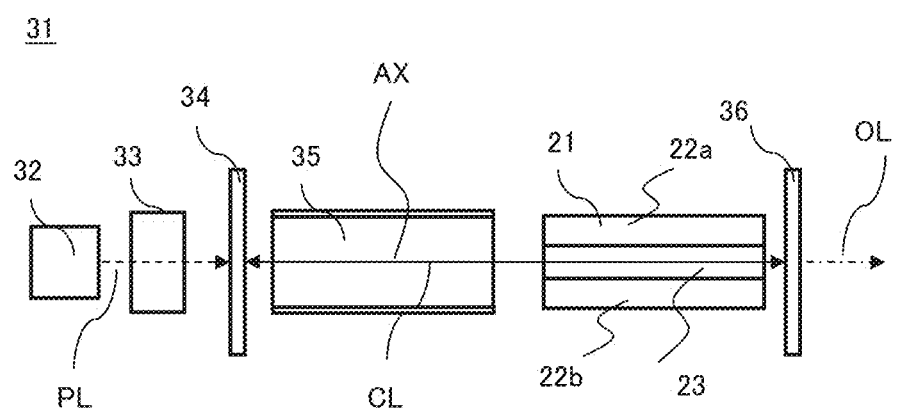
FIG. 4 is a structural view of a planar waveguide type passively Q-switched laser device using the planar waveguide type passively Q-switched element according to Embodiment 2 of the present invention.

Next, an operation is described. FIG. 4 is a structural view of a planar waveguide type passively Q-switched laser device 31 using the planar waveguide type passively Q-switched element 21. In FIG. 4, the planar waveguide type passively Q-switched laser device 31 includes the planar waveguide type passively Q-switched element 21, a planar waveguide type semiconductor laser 32, an excitation optical system 33, a total reflection mirror 34, a laser material 35, and an output mirror 36.

Note that, the semiconductor laser 32 serves as an excitation light source for the laser material 35, and the total reflection mirror 34 and the output mirror 36 form a planar waveguide type resonator.

Excitation light PL is output from the semiconductor laser 32 and is shaped by the excitation optical system 33 so as to be collimated light in a waveguide horizontal direction without being lost in a waveguide vertical direction in the planar waveguide type laser material 35. Then, the excitation light PL passes through the total reflection mirror 34 to enter the planar waveguide type laser material 35. The planar waveguide type laser material 35 is excited with the excitation light PL to generate spontaneous emission light. Part of the spontaneous emission light reciprocates between the total reflection mirror 34 and the output mirror 36 and is amplified every time the light passes through the planar waveguide type laser material 35.

When a gain increases due to a loss in a resonator including a loss caused by the absorption by the first saturable absorber 22a and the second saturable absorber 22b, laser oscillation starts in the resonator. At a time of circulation where laser oscillation occurs, due to the planar waveguide type passively Q-switched element 21, a component of resonance light CL which propagates through the first saturable absorber 22a and the second saturable absorber 22b provided on outer sides of the waveguide of the planar waveguide type passively Q-switched element 21 is absorbed by the first saturable absorber 22a and the second saturable absorber 22b, and a component of the resonance light CL which propagates through the transparent material 23 provided in the center portion of the passively Q-switched element 21 passes therethrough without any loss. Therefore, a loss of high-order mode light increases, and only light in a low-order mode oscillates. When oscillation occurs, the first saturable absorber 22a and the second saturable absorber 22b absorb laser light to become transparent. Therefore, a loss becomes small, and Q-switched pulse light in a low-order mode is generated with satisfactory efficiency. Part of the Q-switched pulse light is extracted from the output mirror 36 as oscillation light OL.

The total reflection mirror 34 and the output mirror 36 may be formed by integrally providing dielectric films on an end surface of the planar waveguide type laser material 35 and an end surface of the planar waveguide type passively Q-switched element 21, respectively. Thus, a device can be miniaturized.

As described above, in the planar waveguide type passively Q-switched element 21 according to Embodiment 2 of the present invention, the first saturable absorber 22a and the second saturable absorber 22b are respectively bonded optically to two opposed surfaces of the transparent material 23, and the surface (principal plane on an outer side) of the first saturable absorber 22a opposed to the surface bonded to the transparent material 23 and the surface (principal plane on an outer side) of the second saturable absorber 22b opposed to the surface bonded to the transparent material 23 form a waveguide. Therefore, the planar waveguide type passively Q-switched element 21 is allowed to have a mode selection function besides the original Q-switch function, and Q-switched pulse light in a low-order mode with satisfactory efficiency can be obtained without changing the size of a laser device. Further, it becomes possible to control a mode also in a waveguide in which a mode cannot be controlled spatially.

Embodiment 3

Figure 5:
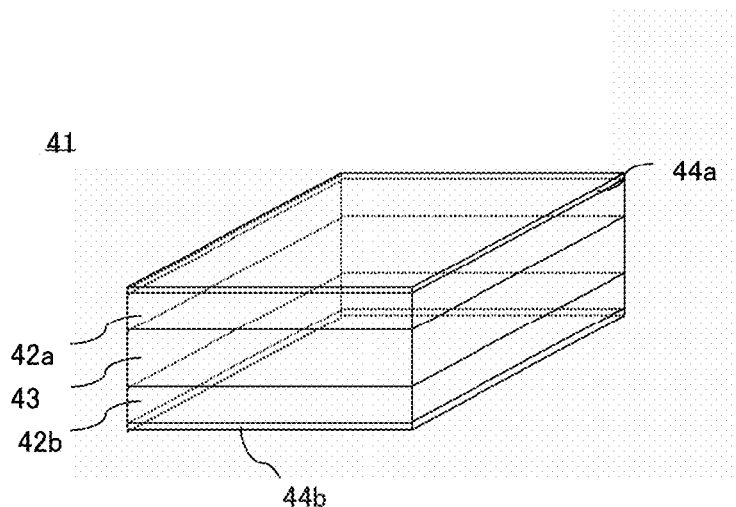
FIG. 5 is a structural view illustrating a planar waveguide type passively Q-switched element according to Embodiment 3 of the present invention.

FIG. 5 is a structural view illustrating a planar waveguide type passively Q-switched element 41 according to Embodiment 3 of the present invention. In FIG. 5, the planar waveguide type passively Q-switched element 41 includes a first saturable absorber 42a having a planar shape, a second saturable absorber 42b having a planar shape, a transparent material 43 having a planar shape, a first cladding film 44a, and a second cladding film 44b.

The first saturable absorber 42a and the second saturable absorber 42b are respectively bonded optically to two opposed surfaces of the transparent material 43. The first cladding film 44a is provided on a surface of the first saturable absorber 42a opposed to the surface bonded to the transparent material 43, and the second cladding film 44b is provided on a surface of the second saturable absorber 42b opposed to the surface bonded to the transparent material 43. The surface (principal plane on an outer side) of the first saturable absorber 42a opposed to the surface bonded to the transparent material 43 and the surface (principal plane on an outer side) of the second saturable absorber 42b opposed to the surface bonded to the transparent material 43 form a waveguide.

In the planar waveguide type passively Q-switched element 41, the transparent material 43 is formed of a material having a thermal expansion coefficient substantially equal to or equal to those of the first saturable absorber 42a and the second saturable absorber 42b so as to suppress cracking caused by a stress during bonding. Further, the transparent material 43 is formed of a material having a refractive index lower than those of the first saturable absorber 42a and the second saturable absorber 42b so as to suppress reflection at interfaces with respect to the first saturable absorber 42a and the second saturable absorber 42b. The first cladding film 44a and the second cladding film 44b are each formed of a material having a refractive index lower than those of the first saturable absorber 42a and the second saturable absorber 42b.

For example, in the case where the first saturable absorber 42a and the second saturable absorber 42b are formed of $Cr^{4+}$:YAG or $V^{3+}$:YAG, it is appropriate to use additive-free YAG having a refractive index (about 1.83) and a thermal expansion coefficient (about $7.8 \times 10^{-6}$/K) close to those of $Cr^{4+}$:YAG or $V^{3+}$:YAG for the transparent material 43, and to use $SiO_2$ (refractive index: about 1.45), $Al_2O_3$ (refractive index: about 1.61), $M_2$ (refractive index: about 1.62), $M_3$ (refractive index: about 1.74), or $Y_2O_3$ (refractive index: about 1.81) for the first cladding film 44a and the second cladding film 44b.

Further, in the case of using Co:Spinel for the first saturable absorber 42a and the second saturable absorber 42b, it is appropriate to use additive-free Spinel having a refractive index (about 1.70) and a thermal expansion coefficient (about $7.45 \times 10^{-6}$/K) for the transparent material 43, and to use $SiO_2$ (refractive index: about 1.45), $Al_2O_3$ (refractive index: about 1.61), or $M_2$ (refractive index: about 1.62) for the first cladding film 44a and the second cladding film 44b.

Further, in the case of using Co2+:ZnSe or Cr2+:ZnSe for the first saturable absorber 42a and the second saturable absorber 42b, it is appropriate to use additive-free ZnSe having a refractive index (about 2.49) and a thermal expansion coefficient (about $7.6 \times 10^{-6}$/K) for the transparent material 43, and in the case of using Co2+:ZnS or Cr2+:ZnS for the first saturable absorber 42a and the second saturable absorber 42b, it is appropriate to use additive-free ZnS having a refractive index (about 2.29) and a thermal expansion coefficient (about $6.5 \times 10^{-6}$/K) for the transparent material 43, and to use $SiO_2$ (refractive index: about 1.45), $Al_2O_3$ (refractive index: about 1.61), $M_2$ (refractive index: about 1.62), $M_3$ (refractive index: about 1.74), $Y_2O_3$ (refractive index: about 1.81), $HfO_3$ (refractive index: about 1.90), or $Ta_2O_5$ (refractive index: about 2.09) for the first cladding film 44a and the second cladding film 44b.

Further, the first saturable absorber 42a and the second saturable absorber 42b are optically connected to the transparent material 43, and for example, there is a method of integrally sintering the first saturable absorber 42a and the second saturable absorber 42b, and the transparent material 43 with a ceramics material.

Further, there is a method of integrally bonding the first saturable absorber 42a and the second saturable absorber 42b to the transparent material 43 through diffusion bonding.

Further, there is a method of integrally bonding the first saturable absorber 42a and the second saturable absorber 42b to the transparent material 43 through surface-activated bonding.

Further, there is a method of integrally bonding the first saturable absorber 42a and the second saturable absorber 42b to the transparent material 43 through optical contact.

Further, there is a method of causing the first saturable absorber 42a and the second saturable absorber 42b to adhere to the transparent material 43 integrally with an optical adhesive.

Figure 6:
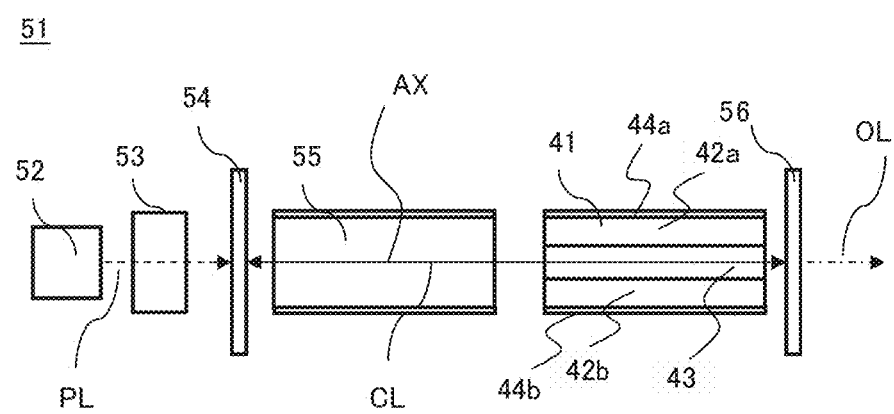
FIG. 6 is a structural view of a planar waveguide type passively Q-switched laser device using the planar waveguide type passively Q-switched element according to Embodiment 3 of the present invention.

Next, an operation is described. FIG. 6 is a structural view of a planar waveguide type passively Q-switched laser device 51 using the planar waveguide type passively Q-switched element 41. In FIG. 6, the planar waveguide type passively Q-switched laser device 51 includes the planar waveguide type passively Q-switched element 41, a semiconductor laser 52, an excitation optical system 53, a total reflection mirror 54, a planar waveguide type laser material 55, and an output mirror 56.

Note that, the semiconductor laser 52 serves as an excitation light source for the laser material 55, and the total reflection mirror 54 and the output mirror 56 form a planar waveguide type resonator.

Excitation light PL is output from the semiconductor laser 52 and is shaped by the excitation optical system 53 so as to be collimated light in a waveguide horizontal direction without being lost in a waveguide vertical direction in the planar waveguide type laser material 55. Then, the excitation light PL passes through the total reflection mirror 54 to enter the planar waveguide type laser material 55. The planar waveguide type laser material 55 is excited with the excitation light PL to generate spontaneous emission light. Part of the spontaneous emission light reciprocates between the total reflection mirror 54 and the output mirror 56 and is amplified every time the light passes through the planar waveguide type laser material 55.

When a gain increases due to a loss in a resonator including a loss caused by the absorption by the first saturable absorber 42a and the second saturable absorber 42b, laser oscillation starts in the resonator. At a time of circulation where laser oscillation occurs, due to the planar waveguide type passively Q-switched element 41, a component of resonance light CL which propagates through the first saturable absorber 42a and the second saturable absorber 42b present on outer sides of the waveguide of the planar waveguide type passively Q-switched element 41 is absorbed by the first saturable absorber 42a and the second saturable absorber 42b, and a component of the resonance light CL which propagates through the transparent material 43 present in the center portion of the passively Q-switched element 41 passes therethrough without any loss. Therefore, a loss of high-order mode light increases, and only light in a low-order mode oscillates. When oscillation occurs, the first saturable absorber 42a and the second saturable absorber 42b absorb laser light to become transparent. Therefore, a loss becomes small, and Q-switched pulse light in a low-order mode is generated with satisfactory efficiency. Part of the Q-switched pulse light is extracted from the output mirror 56 as oscillation light OL.

The total reflection mirror 54 and the output mirror 56 may be formed by integrally providing dielectric films on an end surface of the planar waveguide type laser material 55 and an end surface of the planar waveguide type passively Q-switched element 41, respectively. Thus, a device can be miniaturized.

Figure 7:
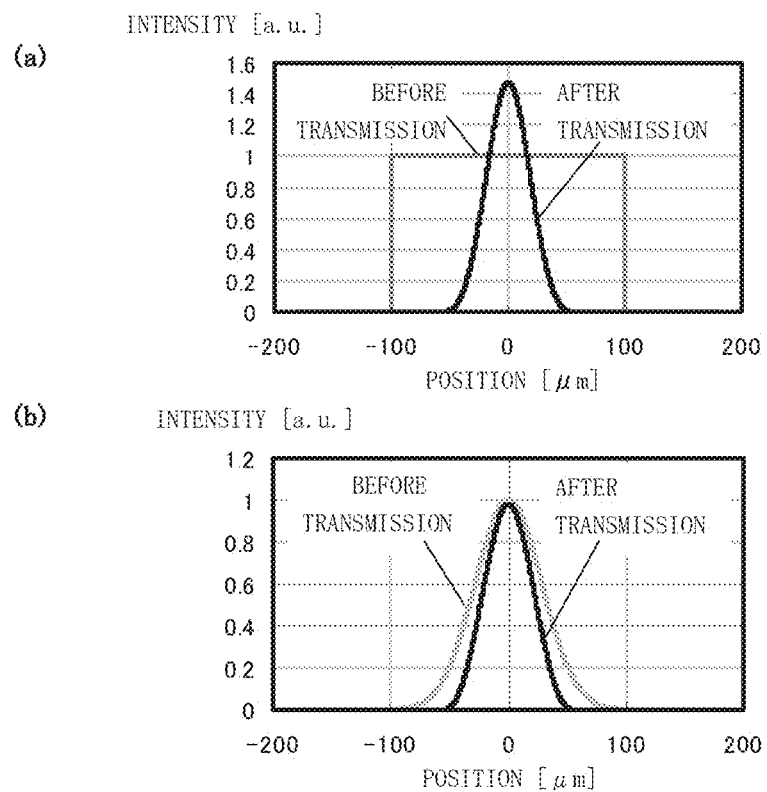
FIG. 7 is graph showing simulation results according to a beam propagation method (BPM) of the planar waveguide type passively Q-switched element according to Embodiment 3 of the present invention.

Next, an example of simulation is described. FIG. 7 shows simulation results according to a beam propagation method (BPM).

An (a) in FIG. 7 shows an intensity distribution before and after the transmission at a time when a tophat beam having a beam diameter of 200 μm assuming high-order mode light enters a waveguide in which the first saturable absorber 42a and the second saturable absorber 42b are formed of $Cr^{4+}$:YAG (refractive index: 1.813, attenuation coefficient: $4.2 \times 10^{-5}$ (corresponding to absorption coefficient of about 5 $cm^{-1}$)) having a thickness of 50 um (=μm), the transparent material 43 is formed of additive-free YAG (refractive index: 1.813) having a thickness of 100 μm, and the first cladding film 44a and the second cladding film 44b are formed of $Al_2O_3$ (refractive index: 1.613) having a thickness of 0.4 um.

A (b) in FIG. 7 shows an intensity distribution before and after the transmission at a time when a Gaussian beam having a beam diameter of 200 μm ($1/e^2$) assuming low-order mode light enters the above-mentioned waveguide.

As a result, in the case where the incident beam has a tophat shape (case of (a) in FIG. 7), the transmittance is estimated to be 0.33, whereas in the case where the incident beam has a Gaussian shape (case of (b) in FIG. 7), the transmittance is estimated to be 0.69. Thus, it is found that a loss is larger in high-order mode light.

The resonance light CL in a vertical direction propagates through a waveguide, and the resonance light CL in a horizontal direction propagates in a radiation mode. It has been described that a low-order mode can be achieved in the vertical direction by providing the saturable absorbers (42a, 42b). A low-order mode can also be achieved in the horizontal direction by providing a saturable absorber 122 and cladding films 124a to 124d over the entire circumference of a laser light propagation direction axis of a laser material 123 corresponding to a transparent material, as in a ridge waveguide type Q-switched element 121 illustrated in FIG. 14.

Even in the case of the planar waveguide type passively Q-switched laser device, saturable absorbers or further cladding films are provided in the horizontal direction as well as in the vertical direction of the transparent material or the laser material of the planar waveguide type passively Q-switched element (over the entire circumference of the laser light propagation direction axis). The shape of the saturable absorber and the cladding film may be any shape such as a combination of planar shapes, a ring shape, or the like.

As described above, in the planar waveguide type passively Q-switched element 41 according to Embodiment 3 of the present invention, the first saturable absorber 42a and the second saturable absorber 42b are respectively bonded optically to two opposed surfaces of the transparent material 43, and the surface (principal plane on an outer side) of the first saturable absorber 42a opposed to the surface bonded to the transparent material 43 and the surface (principal plane on an outer side) of the second saturable absorber 42b opposed to the surface bonded to the transparent material 43 form a waveguide. Therefore, the passively Q-switched element 41 is allowed to have a mode selection function besides the original Q-switch function, and Q-switched pulse light in a low-order mode with satisfactory efficiency can be obtained without changing the size of a laser device. Further, it becomes possible to control a mode also in a waveguide in which a mode cannot be controlled spatially.

Embodiment 4

Figure 8:
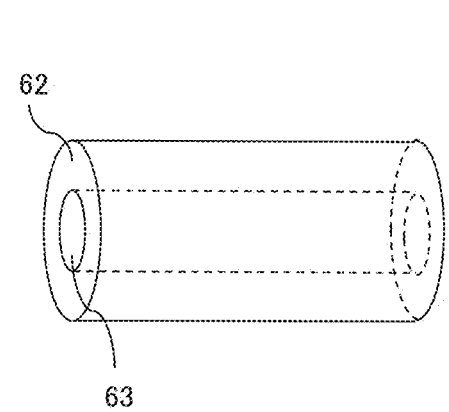
FIG. 8 is a structural view illustrating a passively Q-switched element according to Embodiment 4 of the present invention.

FIG. 8 is a structural view illustrating a passively Q-switched element 61 according to Embodiment 4 of the present invention. In FIG. 8, the passively Q-switched element 61 includes a ring-shaped saturable absorber 62 and a disk-shaped laser material 63, and the saturable absorber 62 is optically bonded to the circumference of the laser material 63.

In the passively Q-switched element 61, the saturable absorber 62 and the laser material 63 having substantially the same or the same refractive index and thermal expansion coefficient are used. When the refractive index difference between the saturable absorber 62 and the laser material 63 is large, a loss caused by a wavefront aberration increases, and hence the refractive index difference is preferred to be small. In order to set the wavefront aberration λ/4 or less at a p-v value (wavefront aberration loss of 0.012), assuming that the wavelength is 1,064 nm and the thickness of the passively Q-switched element 61 is 1 mm, the refractive index difference between the saturable absorber 62 and the laser material 63 is estimated by the following expression:

$$\Delta\phi_{RMS}=1/4 > \Delta n \times L/\lambda$$

where $\Delta\phi_{RMS}$=wavefront aberration
$\Delta n$: refractive index difference
L: thickness of passively Q-switched element 61
λ: wavelength Thus, it is required that the refractive index difference be 0.000266 or less.

For example, in the case of using Nd:YAG or Yb:YAG for the laser material 63, it is appropriate to use $Cr^{4+}$:YAG or $V^{3+}$:YAG having a refractive index (about 1.83) and a thermal expansion coefficient (about $7.8\times10^{-6}$/K) close to those of Nd:YAG or Yb:YAG, which is used as a passively Q-switched material in a band of 0.9 to 1.3 μm, for the saturable absorber 62.

Further, the saturable absorber 62 and the laser material 63 are optically connected to each other, and for example, there is a method of integrally sintering the saturable absorber 62 and the laser material 63 with a ceramics material.

Further, there is a method of integrally bonding the saturable absorber 62 to the laser material 63 through diffusion bonding.

Further, there is a method of integrally bonding the saturable absorber 62 to the laser material 63 through surface-activated bonding.

Further, there is a method of integrally bonding the saturable absorber 62 to the laser material 63 through optical contact.

Further, there is a method of causing the saturable absorber 62 to adhere to the laser material 63 integrally with an optical adhesive.

Figure 9:
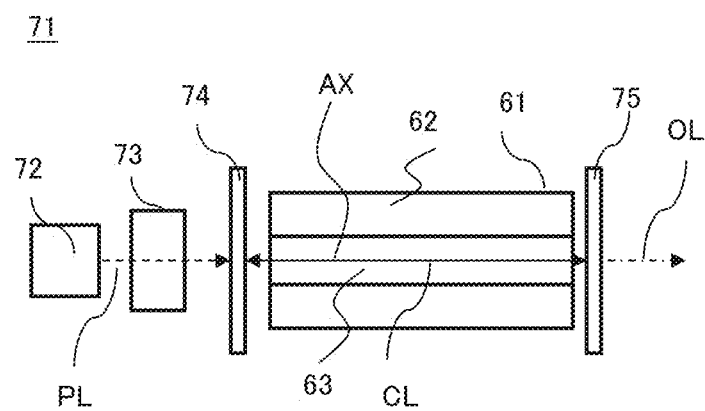
FIG. 9 is a structural view of a passively Q-switched laser device using the passively Q-switched element according to Embodiment 4 of the present invention.

Next, an operation is described. FIG. 9 is a structural view of a passively Q-switched laser device 71 using the passively Q-switched element 61. In FIG. 9, the passively Q-switched laser device 71 includes the passively Q-switched element 61, a semiconductor laser 72, an excitation optical system 73, a total reflection mirror 74, and an output mirror 75.

Note that, the semiconductor laser 72 serves as an excitation light source for the laser material 63 in the passively Q-switched element 61, and the total reflection mirror 74 and the output mirror 75 form a spatial resonator.

Excitation light PL is output from the semiconductor laser 72. The excitation light PL is shaped by the excitation optical system 73 so as to be collimated light in the laser material 63 in the passively Q-switched element 61 and passes through the total reflection mirror 74 to enter the laser material 63 in the passively Q-switched element 61. The laser material 63 in the passively Q-switched element 61 is excited with the excitation light PL to generate spontaneous emission light. Part of the spontaneous emission light reciprocates between the total reflection mirror 74 and the output mirror 75 and is amplified every time the light passes through the laser material 63 in the passively Q-switched element 61.

When a gain increases due to a loss in a resonator including a loss caused by the absorption by the saturable absorber 62 in the passively Q-switched element 61, laser oscillation starts in the resonator. At a time of circulation where laser oscillation occurs, due to the passively Q-switched element 61, a component of resonance light CL which propagates through the saturable absorber 62 on an outer side of the passively Q-switched element 61 is absorbed by the saturable absorber 62, and a component of the resonance light CL which propagates through the laser material 63 in the passively Q-switched element 61 passes therethrough without any loss. Therefore, a loss of high-order mode light increases, and only light in a low-order mode oscillates. When oscillation occurs, the saturable absorber 62 absorbs laser light to become transparent. Therefore, a loss becomes small, and Q-switched pulse light in a low-order mode is generated with satisfactory efficiency. Part of the Q-switched pulse light is extracted from the output mirror 75 as oscillation light OL.

The total reflection mirror 74 and the output mirror 75 may be formed by integrally providing dielectric films on end surfaces of the passively Q-switched element 61, respectively. Thus, a device can be miniaturized.

Although the laser material 63 is formed into a circular shape (disk shape), the laser material may be formed into a rectangular shape (cubic shape: the shape of a cross-section perpendicular to the propagation direction of laser light is rectangular, which similarly applies to the following) and the saturable absorber may be bonded to the circumference of the laser material. Forming the laser material in a cubic shape is effective in the case where the horizontal direction and the vertical direction of a beam can be separated.

As described above, in the passively Q-switched element 61 according to Embodiment 4 of the present invention, the ring-shaped saturable absorber 62 is optically bonded to the circumference of the disk-shaped laser material 63. Therefore, the passively Q-switched element 61 is allowed to have a mode selection function besides the original Q-switch function, and Q-switched pulse light in a low-order mode with satisfactory efficiency can be obtained without changing the size of a laser device. Further, the passively Q-switched element 61 also serves as a laser material, and hence a laser device can be miniaturized.

Embodiment 5

Figure 10:
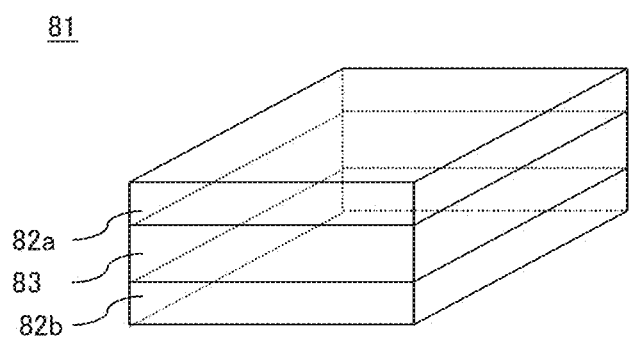
FIG. 10 is a structural view illustrating a planar waveguide type passively Q-switched element according to Embodiment 5 of the present invention.

FIG. 10 is a structural view illustrating a planar waveguide type passively Q-switched element 81 according to Embodiment 5 of the present invention. In FIG. 10, the planar waveguide type passively Q-switched element 81 includes a first saturable absorber 82a having a planar shape, a second saturable absorber 82b having a planar shape, and a laser material 83 having a planar shape.

The first saturable absorber 82a and the second saturable absorber 82b are respectively bonded optically to two opposed surfaces of the laser material 83, and a surface (principal plane on an outer side) of the first saturable absorber 82a opposed to the surface bonded to the laser material 83 and a surface (principal plane on an outer side) of the second saturable absorber 82b opposed to the surface bonded to the laser material 83 form a waveguide.

In the planar waveguide type passively Q-switched element 81, the laser material 83 is formed of a material having a thermal expansion coefficient substantially equal to or equal to those of the first saturable absorber 82a and the second saturable absorber 82b so as to suppress cracking caused by a stress during bonding. Further, the laser material 83 is formed of a material having a refractive index lower than those of the first saturable absorber 82a and the second saturable absorber 82b so as to suppress reflection at interfaces with respect to the first saturable absorber 82a and the second saturable absorber 82b.

For example, in the case of using Nd:YAG or Yb:YAG for the laser material 83, it is appropriate to use $Cr^{4+}$:YAG or $V^{3+}$:YAG having a refractive index (about 1.83) and a thermal expansion coefficient (about $7.8 \times 10^{-6}$/K) close to those of Nd:YAG or Yb:YAG, which is used as a passively Q-switched material in a band of 0.9 to 1.3 μm, for the first saturable absorber 82a and the second saturable absorber 82b.

For example, in the case of using Er:glass (refractive index: 1.53) for the laser material 83, it is appropriate to use Co:Spinel having a refractive index (about 1.70) and a thermal expansion coefficient (about $7.45 \times 10^{-6}$/K), Co2+:ZnSe or Cr2+:ZnSe having a refractive index (about 2.49) and a thermal expansion coefficient (about $7.6 \times 10^{-6}$/K), or Co2+:ZnS or Cr2+:ZnS having a refractive index (about 2.29) and a thermal expansion coefficient (about $6.5 \times 10^{-6}$/K), which is used as an eye-safe band passively Q-switched material, for the first saturable absorber 82a and the second saturable absorber 82b.

Further, in the case of using Er:YAG (refractive index: 1.813) for the laser material 83, it is appropriate to use Co2+:ZnSe or Cr2+:ZnSe having a refractive index (about 2.49) and a thermal expansion coefficient (about $7.6 \times 10^{-6}$/K), or Co2+:ZnS or Cr2+:ZnS having a refractive index (about 2.29) and a thermal expansion coefficient (about $6.5 \times 10^{-6}$/K), which is used as an eye-safe band passively Q-switched material, for the first saturable absorber 82a and the second saturable absorber 82b.

In the case of using Er:YVO4 (ordinary refractive index: about 1.98, extraordinary refractive index: about 2.18) for the laser material 83, it is appropriate to use Co2+:ZnSe or Cr2+:ZnSe having a refractive index (about 2.49) and a thermal expansion coefficient (about $7.6 \times 10^{-6}$/K), or Co2+:Zns or Cr2+:ZnS having a refractive index (about 2.29) and a thermal expansion coefficient (about $6.5 \times 10^{-6}$/K), which is used as an eye-safe band passively Q-switched material, for the first saturable absorber 82a and the second saturable absorber 82b.

Further, the first saturable absorber 82a and the second saturable absorber 82b are optically connected to the laser material 83, and for example, there is a method of integrally sintering the first saturable absorber 82a and the second saturable absorber 82b, and the laser material 83 with a ceramics material.

Further, there is a method of integrally bonding the first saturable absorber 82a and the second saturable absorber 82b to the laser material 83 through diffusion bonding.

Further, there is a method of integrally bonding the first saturable absorber 82a and the second saturable absorber 82b to the laser material 83 through surface-activated bonding.

Further, there is a method of integrally bonding the first saturable absorber 82a and the second saturable absorber 82b to the laser material 83 through optical contact.

Further, there is a method of causing the first saturable absorber 82a and the second saturable absorber 82b to adhere to the laser material 83 integrally with an optical adhesive.

Figure 11:
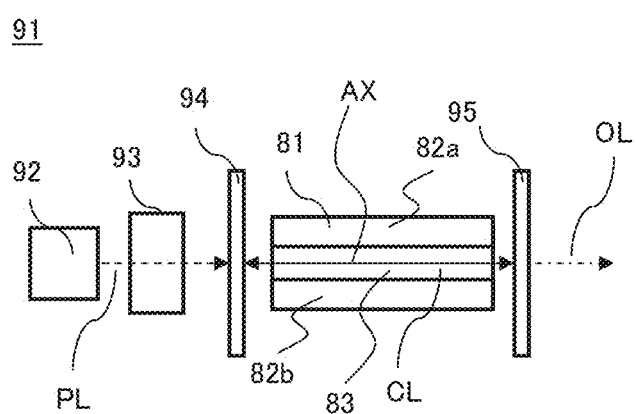
FIG. 11 is a structural view of a planar waveguide type passively Q-switched laser device using the planar waveguide type passively Q-switched element according to Embodiment 5 of the present invention.

Next, an operation is described. FIG. 11 is a structural view of a planar waveguide type passively Q-switched laser device 91 using the planar waveguide type passively Q-switched element 81. In FIG. 11, the planar waveguide type passively Q-switched laser device 91 includes the planar waveguide type passively Q-switched element 81, a planar waveguide type semiconductor laser 92, an excitation optical system 93, a total reflection mirror 94, and an output mirror 95.

Note that, the semiconductor laser 92 serves as an excitation light source for the laser material 83 in the passively Q-switched element 81, and the total reflection mirror 94 and the output mirror 95 form a planar waveguide type resonator.

Excitation light PL is output from the semiconductor laser 92 and is shaped by the excitation optical system 93 so as to be collimated light in a waveguide horizontal direction without being lost in a waveguide vertical direction in the planar waveguide type passively Q-switched element 81. Then, the excitation light PL passes through the total reflection mirror 94 to enter the planar waveguide type passively Q-switched element 81. The laser material 83 in the planar waveguide type passively Q-switched element 81 is excited with the excitation light PL to generate spontaneous emission light. Part of the spontaneous emission light reciprocates between the total reflection mirror 94 and the output mirror 95 and is amplified every time the light passes through the laser material 83 in the planar waveguide type passively Q-switched element 81.

When a gain increases due to a loss in a resonator including a loss caused by the absorption by the first saturable absorber 82a and the second saturable absorber 82b, laser oscillation starts in the resonator. At a time of circulation where laser oscillation occurs, due to the planar waveguide type passively Q-switched element 81, a component of resonance light CL which propagates through the first saturable absorber 82a and the second saturable absorber 82b present on outer sides of the waveguide of the planar waveguide type passively Q-switched element 81 is absorbed by the first saturable absorber 82a and the second saturable absorber 82b, and a component of the resonance light CL which propagates through the laser material 83 present in the center portion of the passively Q-switched element 81 passes therethrough without any loss. Therefore, a loss of high-order mode light increases, and only light in a low-order mode oscillates. When oscillation occurs, the first saturable absorber 82a and the second saturable absorber 82b absorb laser light to become transparent. Therefore, a loss becomes small, and Q-switched pulse light in a low-order mode is generated with satisfactory efficiency. Part of the Q-switched pulse light is extracted from the output mirror 95 as oscillation light OL.

The total reflection mirror 94 and the output mirror 95 may be formed by integrally providing dielectric films on both end surfaces of the planar waveguide type passively Q-switched element 81, respectively. Thus, a device can be miniaturized.

As described above, in the planar waveguide type passively Q-switched element 81 according to Embodiment 5 of the present invention, the first saturable absorber 82a and the second saturable absorber 82b are respectively bonded optically to two opposed surfaces of the laser material 83, and the surface (principal plane on an outer side) of the first saturable absorber 82a opposed to the surface bonded to the laser material 83 and the surface (principal plane on an outer side) of the second saturable absorber 82b opposed to the surface bonded to the laser material 83 form a waveguide. Therefore, the planar waveguide type passively Q-switched element 81 is allowed to have a mode selection function besides the original Q-switch function, and Q-switched pulse light in a low-order mode with satisfactory efficiency can be obtained. Further, the planar waveguide type passively Q-switched element 81 also serves as a laser material, and hence a laser device can be miniaturized, and a coupling loss usually occurring between a waveguide type laser material and a waveguide type Q-switched element can be suppressed. Further, it becomes possible to control a mode also in a waveguide in which a mode cannot be controlled spatially.

Embodiment 6

Figure 12:
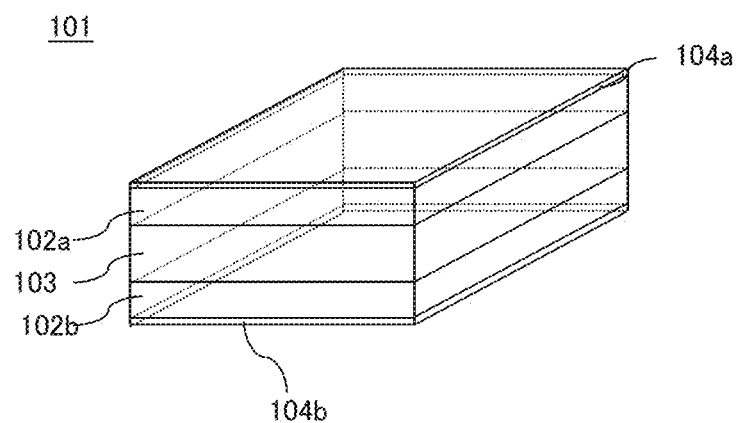
FIG. 12 is a structural view illustrating a planar waveguide type passively Q-switched element according to Embodiment 6 of the present invention.

FIG. 12 is a structural view illustrating a planar waveguide type passively Q-switched element 101 according to Embodiment 6 of the present invention. In FIG. 12, the planar waveguide type passively Q-switched element 101 includes a first saturable absorber 102a having a planar shape, a second saturable absorber 102b having a planar shape, a laser material 103 having a planar shape, a first cladding film 104a, and a second cladding film 104b.

The first saturable absorber 102a and the second saturable absorber 102b are respectively bonded optically to two opposed surfaces of the laser material 103. The first cladding film 104a is provided on a surface of the first saturable absorber 102a opposed to the surface bonded to the laser material 103, and the second cladding film 104b is provided on a surface of the second saturable absorber 102b opposed to the surface bonded to the laser material 103. The surface (principal plane on an outer side) of the first saturable absorber 102a opposed to the surface bonded to the laser material 103 and the surface (principal plane on an outer side) of the second saturable absorber 102b opposed to the surface bonded to the laser material 103 form a waveguide.

In the planar waveguide type passively Q-switched element 101, the laser material 103 is formed of a material having a thermal expansion coefficient substantially equal to or equal to those of the first saturable absorber 102a and the second saturable absorber 102b so as to suppress cracking caused by a stress during bonding. Further, the laser material 103 is formed of a material having a refractive index lower than those of the first saturable absorber 102a and the second saturable absorber 102b so as to suppress reflection at interfaces with respect to the first saturable absorber 102a and the second saturable absorber 102b. The first cladding film 104a and the second cladding film 104b are each formed of a material having a refractive index lower than those of the first saturable absorber 102a and the second saturable absorber 102b.

For example, in the case of using Nd:YAG or Yb:YAG for the laser material 103, it is appropriate to use $Cr^{4+}$:YAG or $V^{3+}$:YAG having a refractive index (about 1.83) and a thermal expansion coefficient (about $7.8 \times 10^{-6}$/K) close to those of Nd:YAG or Yb:YAG, which is used as a passively Q-switched material in a band of 0.9 to 1.3 μm, for the first saturable absorber 102a and the second saturable absorber 102b, and to use $SiO_2$ (refractive index: about 1.45), $Al_2O_3$ (refractive index: about 1.61), $M_2$ (refractive index: about 1.62), $M_3$ (refractive index: about 1.74), or $Y_2O_3$ (refractive index: about 1.81) for the first cladding film 104a and the second cladding film 104b.

For example, in the case of using Er:glass (refractive index: 1.53) for the laser material 103, it is appropriate to use Co:Spinel having a refractive index (about 1.70) and a thermal expansion coefficient (about $7.45 \times 10^{-6}$/K), Co2+:ZnSe or Cr2+:ZnSe having a refractive index (about 2.49) and a thermal expansion coefficient (about $7.6 \times 10^{-6}$/K), or Co2+: ZnS or Cr2+:ZnS having a refractive index (about 2.29) and a thermal expansion coefficient (about $6.5 \times 10^{-6}$/K), which is used as an eye-safe band passively Q-switched material, for the first saturable absorber 102a and the second saturable absorber 102b. In the case of using Co:Spinel for the first saturable absorber 102a and the second saturable absorber 102b, it is appropriate to use $SiO_2$ (refractive index: about 1.45), $Al_2O_3$ (refractive index: about 1.61), or $M_2$ (refractive index: about 1.62) for the first cladding film 104a and the second cladding film 104b. Further, in the case of using Co2+:ZnSe, Cr2+:ZnSe, Co2+:ZnS, or Cr2+:ZnS for the first saturable absorber 102a and the second saturable absorber 102b, it is appropriate to use $SiO_2$ (refractive index: about 1.45), $Al_2O_3$ (refractive index: about 1.61), $M_2$ (refractive index: about 1.62), $M_3$ (refractive index: about 1.74), $Y_2O_3$ (refractive index: about 1.81), $HfO_3$ (refractive index: about 1.90), or $Ta_2O_5$ (refractive index: about 2.09) for the first cladding film 104a and the second cladding film 104b.

Further, the first saturable absorber 102a and the second saturable absorber 102b are optically connected to the laser material 103, and for example, there is a method of integrally sintering the first saturable absorber 102a and the second saturable absorber 102b, and the laser material 103 with a ceramics material.

Further, there is a method of integrally bonding the first saturable absorber 102a and the second saturable absorber 102b to the laser material 103 through diffusion bonding.

Further, there is a method of integrally bonding the first saturable absorber 102a and the second saturable absorber 102b to the laser material 103 through surface-activated bonding.

Further, there is a method of integrally bonding the first saturable absorber 102a and the second saturable absorber 102b to the laser material 103 through optical contact.

Further, there is a method of causing the first saturable absorber 102a and the second saturable absorber 102b to adhere to the laser material 103 integrally with an optical adhesive.

Figure 13:
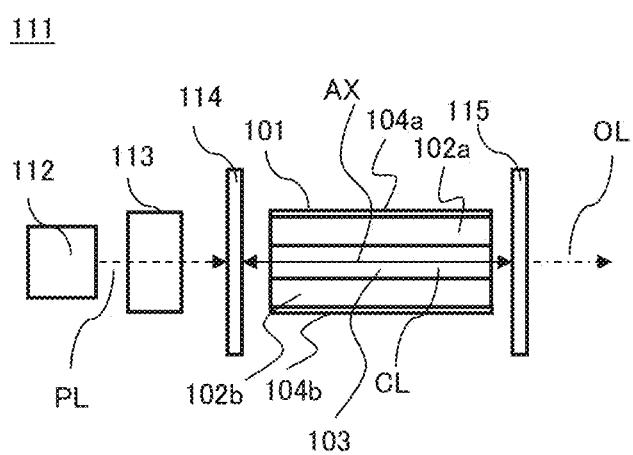
FIG. 13 is a structural view of a planar waveguide type passively Q-switched laser device using the planar waveguide type passively Q-switched element according to Embodiment 6 of the present invention.

Next, an operation is described. FIG. 13 is a structural view of a planar waveguide type passively Q-switched laser device 111 using the planar waveguide type passively Q-switched element 101. In FIG. 13, the planar waveguide type passively Q-switched laser device 111 includes the planar waveguide type passively Q-switched element 101, a semiconductor laser 112, an excitation optical system 113, a total reflection mirror 114, and an output mirror 115.

Note that, the semiconductor laser 112 serves as an excitation light source for the laser material 103 in the passively Q-switched element 101, and the total reflection mirror 114 and the output mirror 115 form a planar waveguide type resonator.

Excitation light PL is output from the semiconductor laser 112 and is shaped by the excitation optical system 113 so as to be collimated light in a waveguide horizontal direction without being lost in a waveguide vertical direction in the planar waveguide type passively Q-switched element 101. Then, the excitation light PL passes through the total reflection mirror 114 to enter the planar waveguide type passively Q-switched element 101. The laser material 103 in the planar waveguide type passively Q-switched element 101 is excited with the excitation light PL to generate spontaneous emission light. Part of the spontaneous emission light reciprocates between the total reflection mirror 114 and the output mirror 115 and is amplified every time the light passes through the laser material 103 in the planar waveguide type passively Q-switched element 101.

When a gain increases due to a loss in a resonator including a loss caused by the absorption by the first saturable absorber 102a and the second saturable absorber 102b, laser oscillation starts in the resonator. At a time of circulation where laser oscillation occurs, due to the planar waveguide type passively Q-switched element 101, a component of resonance light CL which propagates through the first saturable absorber 102a and the second saturable absorber 102b present on outer sides of the waveguide of the planar waveguide type passively Q-switched element 101 is absorbed by the first saturable absorber 102a and the second saturable absorber 102b, and a component of the resonance light CL which propagates through the laser material 103 present in the center portion of the passively Q-switched element 101 passes therethrough without any loss. Therefore, a loss of high-order mode light increases, and only light in a low-order mode oscillates. When oscillation occurs, the first saturable absorber 102a and the second saturable absorber 102b absorb laser light to become transparent. Therefore, a loss becomes small, and Q-switched pulse light in a low-order mode is generated with satisfactory efficiency. Part of the Q-switched pulse light is extracted from the output mirror 115 as oscillation light OL.

The total reflection mirror 114 and the output mirror 115 may be formed by integrally providing dielectric films on both end surfaces of the planar waveguide type passively Q-switched element 101, respectively. Thus, a device can be miniaturized.

Embodiment 7

Figure 14:
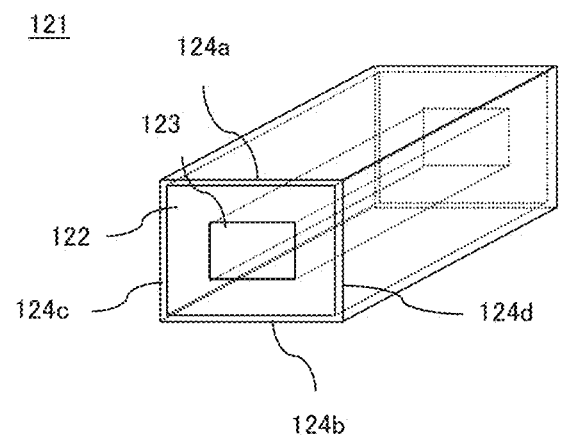
FIG. 14 is a structural view illustrating a ridge waveguide type passively Q-switched element according to Embodiment 7 of the present invention.

FIG. 14 is a structural view illustrating a ridge waveguide type passively Q-switched element 121 according to Embodiment 7 of the present invention. In FIG. 14, the ridge waveguide type passively Q-switched element 121 includes a saturable absorber 122 having a cubic shape in which the center is hollow, a laser material or a transparent material 123 having a cubic shape, a first cladding film 124a, a second cladding film 124b, a third cladding film 124c, and a fourth cladding film 124d.

The saturable absorber 122 is optically bonded to all the surfaces of the laser material 123 parallel to an optical axis. The first to fourth cladding films 124a to 124d are provided on surfaces of the saturable absorber 122 opposed to the surfaces bonded to the laser material 123, and the saturable absorber 122 and the surfaces (principal planes on outer sides) opposed to the surfaces bonded to the laser material 123 form a waveguide.

In the ridge waveguide type passively Q-switched element 121, the laser material 123 is formed of a material having a thermal expansion coefficient substantially equal to or equal to that of the saturable absorber 122 so as to suppress cracking caused by a stress during bonding. Further, the laser material 123 is formed of a material having a refractive index lower than that of the saturable absorber 122 so as to suppress reflection at an interface with respect to the saturable absorber 122. The first to fourth cladding films 124a to 124d are each formed of a material having a refractive index lower than that of the saturable absorber 122.

For example, in the case of using Nd:YAG or Yb:YAG for the laser material 123, it is appropriate to use $Cr^{4+}$:YAG or $V^{3+}$:YAG having a refractive index (about 1.83) and a thermal expansion coefficient (about $7.8\times10^{-6}$/K) close to those of Nd:YAG or Yb:YAG, which is used as a passively Q-switched material in a band of 0.9 to 1.3 μm, for the saturable absorber 122, and to use $SiO_2$ (refractive index: about 1.45), $Al_2O_3$ (refractive index: about 1.61), $M_2$ (refractive index: about 1.62), $M_3$ (refractive index: about 1.74), or $Y_2O_3$ (refractive index: about 1.81) for the first to fourth cladding films 124a to 124d.

For example, in the case of using Er:glass (refractive index: 1.53) for the laser material 123, it is appropriate to use Co:Spinel having a refractive index (about 1.70) and a thermal expansion coefficient (about $7.45\times10^{-6}$/K), Co2+:ZnSe or Cr2+:ZnSe having a refractive index (about 2.49) and a thermal expansion coefficient (about $7.6\times10^{-6}$/K), or Co2+:ZnS or Cr2+:ZnS having a refractive index (about 2.29) and a thermal expansion coefficient (about $6.5\times10^{-6}$/K), which is used as an eye-safe band passively Q-switched material, for the saturable absorber 122. In the case of using Co:Spinel for the saturable absorber 122, it is appropriate to use $SiO_2$ (refractive index: about 1.45), $Al_2O_3$ (refractive index: about 1.61), or $M_2$ (refractive index: about 1.62) for the first to fourth cladding films 124a to 124d. Further, in the case of using Co2+:ZnSe, Cr2+:ZnSe, Co2+:ZnS, or Cr2+:ZnS for the saturable absorber 122, it is appropriate to use $SiO_2$ (refractive index: about 1.45), $Al_2O_3$ (refractive index: about 1.61), $M_2$ (refractive index: about 1.62), $M_3$ (refractive index: about 1.74), $Y_2O_3$ (refractive index: about 1.81), $HfO_3$ (refractive index: about 1.90), or $Ta_2O_5$ (refractive index: about 2.09) for the first to fourth cladding films 124a to 124d.

Further, the saturable absorber 122 is optically connected to the laser material 123, and for example, there is a method of optically sintering the saturable absorber 122, and the laser material 123 with a ceramics material.

Further, there is a method of integrally bonding the saturable absorber 122 to the laser material 123 through diffusion bonding.

Further, there is a method of integrally bonding the saturable absorber 122 to the laser material 123 through surface-activated bonding.

Further, there is a method of integrally bonding the saturable absorber 122 to the laser material 123 through optical contact.

Further, there is a method of causing the saturable absorber 122 to adhere to the laser material 123 integrally with an optical adhesive.

Figure 15:
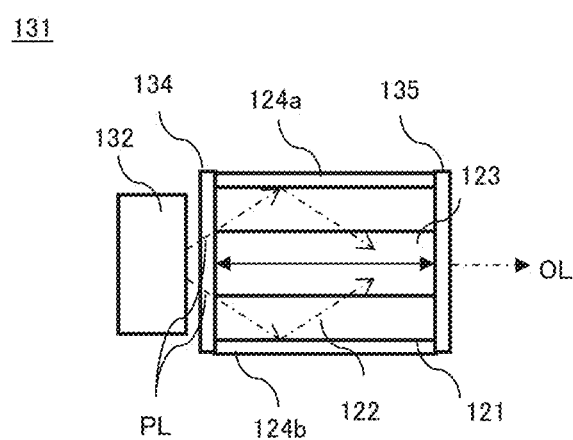
FIG. 15 is a structural view of a ridge waveguide type passively Q-switched laser device using the ridge waveguide type passively Q-switched element according to Embodiment 7 of the present invention.

Next, an operation is described. FIG. 15 is a structural view of a ridge waveguide type passively Q-switched laser device 131 using the ridge waveguide type passively Q-switched element 121. In FIG. 15, the ridge waveguide type passively Q-switched laser device 131 includes the ridge waveguide type passively Q-switched element 121, a semiconductor laser 132, a total reflection film 134, and a partial reflection film 135. The total reflection film 134 and the partial reflection film 135 form a ridge waveguide type resonator.

Excitation light PL output from the semiconductor laser 132 passes through the total reflection film 134 to enter the ridge waveguide type passively Q-switched element 121. The excitation light PL output from the semiconductor laser 132 spreads in a vertical direction and a horizontal direction. A vertical component of the excitation light PL is confined by the first cladding film 124a and the second cladding film 124b of the ridge waveguide type passively Q-switched element 121 and propagates through the waveguide. Further, a horizontal component of the excitation light PL is confined by the third cladding film 124c and the fourth cladding film 124d of the ridge waveguide type passively Q-switched element 121 and propagates through the waveguide.

The laser material 123 in the ridge waveguide type passively Q-switched element 121 is excited with the excitation light PL to generate spontaneous emission light. Part of the spontaneous emission light reciprocates between the total reflection film 134 and the partial reflection film 135 and is amplified every time the light passes through the laser material 123 in the ridge waveguide type passively Q-switched element 121.

When a gain increases due to a loss in a resonator including a loss caused by the absorption by the saturable absorber 122, laser oscillation starts in the resonator. At a time of circulation where laser oscillation occurs, due to the ridge waveguide type passively Q-switched element 121, a component of resonance light CL which propagates through the saturable absorber 122 on an outer circumferential side of the waveguide of the ridge waveguide type passively Q-switched element 121 is absorbed by the saturable absorber 122, and a component of the resonance light CL which propagates through the laser material 123 present in the center portion of the ridge waveguide type passively Q-switched element 121 passes therethrough without any loss. Therefore, a loss of high-order mode light increases, and only light in a low-order mode oscillates. When oscillation occurs, the saturable absorber 122 absorbs laser light to become transparent. Therefore, a loss becomes small, and Q-switched pulse light in a low-order mode is generated with satisfactory efficiency. Part of the Q-switched pulse light serving as oscillation light is extracted from the partial reflection film 135 as output light OL.

In the ridge waveguide type laser, light is confined both in the vertical direction and in the horizontal direction, and hence parasitic oscillation which causes oscillation in an optical path other than that for oscillation light is concerned in the case of increasing an excitation light output. However, in the ridge waveguide type passively Q-switched element 121, the saturable absorber 122 is present on an inner side of the first cladding film 124a, the second cladding film 124b, the third cladding film 124c, and the fourth cladding film 124d, and hence light which oscillates in an optical path other than that for the output light OL is absorbed by the saturable absorber 121, with the result that parasitic oscillation can be suppressed.

As described above, in the ridge waveguide type passively Q-switched element 121 according to Embodiment 7 of the present invention, the saturable absorber 122 is optically bonded to all the surfaces of the laser material 123 parallel to an optical axis, and the first to fourth cladding films 124a to 124d are provided on the surfaces of the saturable absorber opposed to the surfaces bonded to the laser material 123. Therefore, the ridge waveguide type passively Q-switched element 121 has a mode selection function besides the original Q-switch function, and hence Q-switched pulse light in a low-order mode having satisfactory efficiency can be obtained. Further, the ridge waveguide type passively Q-switched element 121 also serves as a laser material, and hence a laser device can be miniaturized, and a coupling loss usually occurring between a waveguide type laser material and a waveguide type Q-switched element can be suppressed. Further, it becomes possible to control a mode also in a waveguide in which a mode cannot be controlled spatially. Further, cladding films are provided both in the horizontal direction and in the vertical direction. Therefore, an excitation optical system is not required, and a laser device can be miniaturized. Further, parasitic oscillation concerned in the case of increasing an excitation light output can be suppressed by the saturable absorber present on the inner side of the cladding films.

Note that, the present invention is not limited to each of the above-mentioned embodiments, and it is needless to say that the present invention includes all the possible combinations of those embodiments.

INDUSTRIAL APPLICABILITY

The present invention can be applied to passively Q-switched elements, passively Q-switched laser devices, and the like in various fields, which can exhibit similar effects.

REFERENCE SIGNS LIST 1, 61 passively Q-switched element, 2, 62 saturable absorber, 3, 23, 43 transparent material, 11, 71 passively Q-switched laser device, 12, 32, 52, 72, 92, 112, 132 semiconductor laser, 13, 33, 53, 73, 93, 113 excitation optical system, 14, 34, 54, 74, 94, 114 total reflection mirror, 134 total reflection film, 15, 35, 55, 63, 83, 103, 123 laser material, 16, 36, 56, 75, 95, 115 output mirror, 135 partial reflection film, 21, 41, 61, 81, 101 planar waveguide type Q-switched element, 121 ridge waveguide type Q-switched element, 22a, 42a, 82a, 102a first saturable absorber, 22b, 42b, 82b, 102b second saturable absorber, 122 saturable absorber, 23, 43 transparent material, 31, 51, 71, 91, 111 planar waveguide type Q-switched laser device, 131 ridge waveguide type Q-switched laser device, 44a, 104a, 124a first cladding film, 44b, 104b, 124b second cladding film, 124c third cladding film, 124d fourth cladding film, PL excitation light, CL resonance light, OL output light, AX propagation direction axis.

The invention claimed is:

1. A planar waveguide type passively Q-switched element, comprising:
an additive-free transparent material having a planar shape;
two saturable absorbers having a planar shape with a refractive index larger than a refractive index of the additive-free transparent material; and
two cladding films having a refractive index smaller than the refractive index of the two saturable absorbers,
wherein surfaces of the two saturable absorbers are respectively bonded optically to two surfaces of the additive-free transparent material, and
wherein the two cladding films are respectively bonded optically to surfaces of the two saturable absorbers opposed to the surfaces bonded to the additive-free transparent material.

2. A passively Q-switched element configured to suppress high-order lasing modes, comprising:
an optical material having an end surface through which laser light propagates along an optical axis that extends through the end surface, and a plurality of side surfaces extending in a direction that is along the optical axis; and
a first pair of saturable absorbers having an end surface and configured to absorb the laser light transmitted along the optical axis through the end surface and having a refractive index larger than a refractive index of the optical material,
wherein each saturable absorber of the first pair of saturable absorbers is optically bonded to a one of the side surfaces such that each saturable absorber of the first pair of saturable absorbers is disposed on opposite sides of the optical material, and
wherein the high-order modes are suppressed by the saturable absorbers causing a greater loss to the high-order modes as compared to a loss of low-order modes.

3. The passively Q-switch element of claim 2, wherein the optical material is a transparent material having a planar shape, and each saturable absorber has a planar shape.

4. The passively Q-switch element of claim 2, further comprising a pair of cladding films, each of the cladding films having a refractive index smaller than the refractive index of the first pair of saturable absorbers, wherein each of the pair of cladding films are respectively bonded optically to side surfaces of the two saturable absorbers opposed to the side surfaces bonded to the optical material side surfaces.

5. The passively Q-switch element of claim 4, wherein the optical material has a planar shape, and each saturable absorber has a planar shape.

6. The passively Q-switched element according to claim 2, wherein the optical material comprises a host material for the saturable absorber.

7. The passively Q-switched element according to claim 2, wherein the optical material and the saturable absorber are integrally sintered with a ceramics material, integrally bonded through diffusion bonding, or integrally bonded through surface-activated bonding.

8. The passively Q-switched element according to claim 2, wherein the optical material is cubic shaped.

9. The passively Q-switched element according to claim 2, wherein the optical material is a laser material.

10. The passively Q-switched element according to claim 9, wherein the laser material is formed of one of Nd:YAG and Yb:YAG, and the saturable absorber is formed of one of $Cr^{4+}$:YAG and $V^{3+}$:YAG.

11. The passively Q-switched element according to claim 9, wherein the laser material is formed of one of Er:glass, Er:YAG, and Er:YVO4, and the saturable absorber is formed of one of Co:SPINEL, Co2+:ZnSe, Co2+:ZnS, Cr2+:ZnSe, and Cr2+:ZnS.

12. The passively Q-switched element according to claim 2, wherein the optical material is a transparent material having a cubic shape.

13. The passively Q-switched element according to claim 12, further including:
 a cladding film having a refractive index smaller than the refractive index of the saturable absorber; and
 a second pair of saturable absorbers having an end surface and configured to absorb the laser light transmitted along the optical axis through the end surface and a refractive index that is approximately equal to refractive index of the first pair of saturable absorbers, each of the second pair of saturable absorbers bonded to the optical material side surface, such that the first pair and the second pair of saturable absorbers extend about a periphery of the optical material; wherein
 the cladding film is bonded optically to side surfaces of the first and the second pair of saturable absorbers opposed to the optical material side surfaces bonded to the transparent material side surfaces.

* * * * *